May 9, 1950 — L. J. BLISH — 2,506,565
SAW FILING GAUGE
Filed April 3, 1948
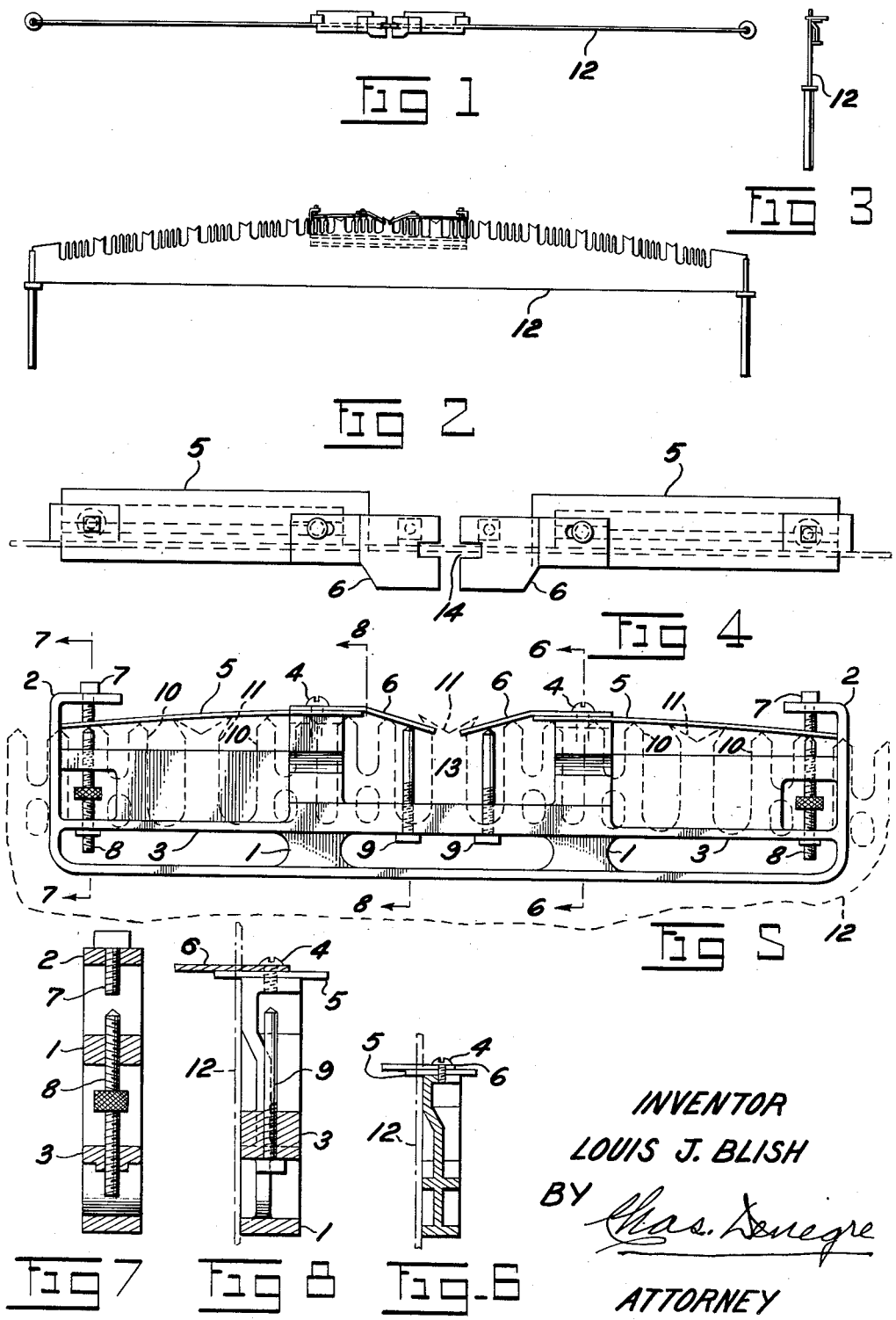
INVENTOR
LOUIS J. BLISH
BY Chas. Denegre
ATTORNEY Patented May 9, 1950

2,506,565

UNITED STATES PATENT OFFICE 2,506,565

SAW FILING GAUGE

Louis J. Blish, St. Clair County, Ala., assignor, by direct and mesne assignments, of fifty per cent to Elizabeth M. Blish and fifty per cent to Walter T. Wilson, Jr., both of Birmingham, Ala.

Application April 3, 1948, Serial No. 18,792

2 Claims. (Cl. 33—202)

This invention relates to a saw filing gauge. It has for its main objects to provide such a gauge that will be highly efficient for the purpose intended, cheap to manufacture, simple in structure, and extremely durable.

A further object is to provide a gauge that will be easy to use in filing large cross cut saws in order that the teeth and drags be properly sharpened and set with relation to each other. The present invention is provided with very unusual means for gauging as a result of special features consisting of adjustable flexible steel strips adapted for easily testing by observation the points of the teeth and drags of a saw.

Other objects and advantages will appear from the drawing and description.

By referring generally to the drawing, part of this application, it will be observed that Fig. 1 is an edge view of a cross cut saw with the filing gauge in place thereon for use; Fig. 2 is a side view of Fig. 1; Fig. 3 is an end view of Fig. 1; Fig. 4 is an enlarged plan view of the gauge; Fig. 5 is an enlarged side view of the gauge in place on part of a saw shown in broken lines; Fig. 6 is a sectional view on line 6—6 of Fig. 5; Fig. 7 is an enlarged sectional view on line 7—7 of Fig. 5; and Fig. 8 is an enlarged sectional view on line 8—8 of Fig. 5.

Similar reference numerals refer to similar parts throughout the several views.

Referring to the drawing in detail it will be seen that the gauge comprises a metal main bracket 1 with upright ends 2 turned toward each other and an extended horizontal side portion 3. Attached to the bracket by screws 4 are two strips of flexible steel 5 and two short steel guides 6. The free ends of the flexible strips are positioned between adjusting set screws 7 and 8 that are supported in the bracket. The ends of the guides are adjustable by screws 9 that are supported in the bracket. The gauge is shown with two sets of flexible steel strips and guides but in use one of the guides is removed. The object of having right and left sets is for the purpose of accommodating right and left hand saw filers. In use the gauge with both strips and one guide is placed adjacent the teeth 10 and drags 11 of the saw 12 as plainly shown in Fig. 5. The ends of the steel strips are adjusted by the set screws so that the curvature of the steel strips will be the same as the edges of the saw teeth and drags. Then the guide is adjusted and set with the side edge 13 of a drag in the slot 14 of the guide. In this condition the filer can see if the teeth that have been filed are in proper shape, thus determined by the edges of the teeth and drags in contact evenly with the curved steel strips as shown in Fig. 5. If not in proper shape the gauge is removed for additional filing of the teeth and drags. If preferred by the filer only one steel strip and one guide may be used.

The gauge may be made of any material suitable for the purpose, but I prefer to use such metals generally used in the manufacture of such tools. Also the gauge may be made in various sizes for use on different shapes and sizes of saws.

While I have shown and described the preferred embodiment of my invention, I do not wish to limit same to the exact and precise details of structure, but reserve the right to make all modifications and changes so long as they remain within the spirit and scope of the following claims.

Having described my invention I claim:

1. A saw filing gauge of the character described comprising, a main metal bracket as the body thereof, each end of the bracket having an integral portion bent at an angle of 90 degrees with its free end toward the center of the bracket, an adjusting screw mounted in each of said bent over portions, a second adjusting screw mounted in each end of the bracket and positioned in line with the screw in the bent over portion, the points of said second screws positioned adjacent the points of the said first screws, two flat pieces of thin steel attached by a screw in the end of each to the bracket with the other end of each inserted between the points of the said sets of adjusting screws; two additional flat pieces of thin steel with one end of each attached to the bracket by the same screw holding one of the other flat pieces of steel, said second pieces of flat steel having a slot in each and having part of the piece extending beyond the plane of one side of the bracket; two adjusting screws mounted in the middle portion of the bracket with the points of said screws positioned in contact with said second flat steel pieces and being adapted for each screw to adjust the free end of the steel piece with which it is in contact.

2. A saw filing gauge of the character described according to claim 1, and being further characterized by said flat steel pieces with their free ends positioned between the points of said set screws being adapted for bending by manual operation of said screws to cause a curve in said pieces of steel to conform to the edges of the teeth of a large type saw when said assembled gauge is positioned adjacent the saw for filing the teeth thereof, and being further characterized by one of said slotted pieces, with the other removed, adapted for being placed adjacent the edge of a tooth or drag in a saw to thus determine a correct position for using the assembled gauge.

LOUIS J. BLISH.

REFERENCES CITED

The following references are of record in the file of this patent:

UNITED STATES PATENTS

| Number | Name | Date |
| --- | --- | --- |
| 1,361,677 | Brown | Dec. 7, 1920 |
| 1,861,508 | Newman | June 7, 1932 |